United States Patent [19]

Sasaki et al.

[11] 4,374,758
[45] Feb. 22, 1983

[54] PREPARATION OF STABLE TELLURIUM-CONTAINING SOLUTION FROM METALLIC TELLURIUM AND PROCESS FOR PRODUCING TELLURIUM-ANTIMONY CONTAINING OXIDE CATALYST USING SAID SOLUTION

[75] Inventors: Yutaka Sasaki, Yokohama; Yoshimi Nakamura, Kawasaki, both of Japan

[73] Assignee: Nitto Chemical Industry Co., Ltd., Tokyo, Japan

[21] Appl. No.: 243,109

[22] Filed: Mar. 12, 1981

[30] Foreign Application Priority Data

Mar. 12, 1980 [JP] Japan ............................. 55-30275

[51] Int. Cl.³ .................. B01J 27/02; B01J 27/24; C01B 19/00
[52] U.S. Cl. ............................ 252/439; 252/438; 423/508
[58] Field of Search ................ 252/438, 439; 423/508

[56] References Cited

U.S. PATENT DOCUMENTS

| | | | |
|---|---|---|---|
| 3,153,085 | 10/1964 | Hadley | 260/465.3 |
| 3,446,834 | 5/1969 | Cavaterra et al. | 260/465.3 |
| 3,641,102 | 2/1972 | Reulet et al. | 260/465.3 |
| 3,668,147 | 6/1972 | Yoshino et al. | 252/439 X |
| 4,049,575 | 9/1977 | Sasaki et al. | 252/439 |
| 4,083,804 | 4/1978 | Saito et al. | 252/439 X |

FOREIGN PATENT DOCUMENTS 2041842  8/1970  Fed. Rep. of Germany .
41-7774  4/1966  Japan .

Primary Examiner—Delbert E. Gantz
Assistant Examiner—William G. Wright
Attorney, Agent, or Firm—Sughrue, Mion, Zinn, Macpeak and Seas

[57] ABSTRACT

A process for preparing a stable tellurium-containing solution from metallic tellurium, a process for producing a tellurium-antimony containing oxide catalyst using the stable tellurium-containing solution, and a catalyst-reactivation process are disclosed.

27 Claims, No Drawings

PREPARATION OF STABLE TELLURIUM-CONTAINING SOLUTION FROM METALLIC TELLURIUM AND PROCESS FOR PRODUCING TELLURIUM-ANTIMONY CONTAINING OXIDE CATALYST USING SAID SOLUTION

FIELD OF THE INVENTION

This invention relates to a process for preparing a stable tellurium-containing solution from metallic tellurium and a process for producing a tellurium-antimony containing oxide catalyst using such solution. The stable tellurium-containing solution prepared by this invention can be used in production of various tellurium-containing compositions. For example, it can be used as a starting material for the production of a tellurium-containing catalyst.

BACKGROUND OF THE INVENTION

Many examples of tellurium-containing catalyst are known, and they include a catalyst of the type described in U.S. Pat. No. 3,153,085 which is made of an oxide containing molybdenum, cobalt, and tellurium, a catalyst of the type described in Japanese Patent Publication No. 7774/66 which is made of an oxide containing molybdenum, zinc, and tellurium, a catalyst of the type described in U.S. Pat. No. 3,446,834 which is made of an oxide containing tellurium and cerium, a catalyst of the type described in U.S. Pat. No. 3,668,147 which is made of an oxide containing antimony, vanadium, molybdenum, tungsten and tellurium, and a catalyst of the type described in U.S. Pat. No. 3,641,102 which is made of an oxide containing molybdenum, iron and tellurium. These catalysts are known to be useful for oxidation of olefins and ammoxidation. Catalysts of the type described above which are made of metal oxides are produced from compounds of the respective metals which are thermally decomposed to oxides, and the nature of this method is such that the compounds used as the starting material are desirably soluble in solvents, particularly in water. The patents mentioned above obtain the tellurium component from metallic tellurium, tellurium dioxide, telluric acid, etc. But an aqueous solution containing tellurium is not easy to prepare from metallic tellurium or tellurium dioxide. In the patents cited above, metallic tellurium and tellurium dioxide are directly mixed with the other catalyst components.

U.S. Pat. No. 4,049,575 describes a method for producing a high-performance antimony-polyvalent metal oxide catalyst useful for the oxidation or ammoxidation of hydrocarbons. The method comprises calcining an antimony polyvalent metal oxide composition used as the catalyst base, impregnating the composition with a solution or suspension containing tellurium and other additives, drying the composition, and finally calcining the dried composition. However, this method has several problems particularly with the preparation of the solution containing tellurium and other additives, and those problems present difficulties in commercial application of the method. In the method of U.S. Pat. No. 4,049,575, and aqueous solution containing tellurium is prepared by a first technique comprising dissolving metallic tellurium, tellurium dioxide, or tellurous acid in nitric acid, or by a second technique comprising dissolving telluric acid in water. But the first technique requires much nitric acid to dissolve the tellurium compound, and because of low solubility of tellurium, a tellurium containing precipitate is formed at low concentration of nitric acid. In addition, the resulting tellurium-containing solution is low in miscibility with other catalyst components such as vanadium, molybdenum, and tungsten. If compounds of these components are added to the tellurium-containing solution, a precipitate results in most cases. Hence, it has been very difficult to produce by the first technique a homogeneous solution of catalyst components that is stable to any concentration. Also, the use of nitric acid presents other problems, such as corrosion of the reaction vessel and air pollution by $NO_x$ in the waste gas. A stable aqueous solution containing tellurium is easily prepared by the second technique of dissolving telluric acid in water, because telluric acid has great solubility in water and does not have a tendency to form readily a precipitate in the presence of other catalyst components. However, telluric acid is conventionally produced by a process involving many refining steps, including oxidation of metallic tellurium with chloric acid or oxidation of tellurium dioxide with potassium permanganate, and, since telluric acid does not find utility in many industrial uses, it is extremely expensive and is therefore not economically suitable for use as a material in commercial production of catalysts. Another problem is that tellurium dioxide and telluric acid of high purity are not readily available, and this is perhaps due to the nature of the processes for making them. As described above, none of the conventional materials for use as a tellurium catalyst component are satisfactory, but since metallic tellurium of relatively high purity is easily available at lower cost than telluric acid, it would be very beneficial metallic tellurium could be as a catalyst component. However, as already mentioned, dissolving metallic tellurium in nitric acid involves three problems, i.e much nitric acid is necessary, the resulting solution is relatively unstable, and it is not highly miscible with other catalyst components. Use of much nitric acid is desirably avoided because it presents other problems such as corrosion of the reaction vessel and air pollution by $NO_x$ in the waste gas.

It is known that a slight amount of metallic tellurium dissolves in hydrogen peroxide at a very slow rate (see *J. Less Common Metals*, Vol. 16, pp. 215-222, 1968), but such a slow reaction rate is impractical. This problem can be solved to some extent by using a powder of metallic tellurium according to the common practice in improving the rate of solid-liquid reaction by increasing the surface area, but the result is still unsatisfactory. Also, a method is known to react metallic tellurium with hydrogen peroxide in the presence of nitric acid (German Patent Application (OLS) No. 2,041,842), but since the presence of nitric acid is essential to this method, corrosion of the reaction vessel and air pollution by $NO_x$ are unavoidable.

To solve the problems of the conventional techniques for preparing a tellurium-containing solution from metallic tellurium, and particularly for use in producing a tellurium-antimony containing oxide catalyst, various studies have been made, resulting in accomplishment of the invention described herein.

SUMMARY OF THE INVENTION

One object of this invention is to provide a simple process by which a stable tellurium-containing solution which has a high concentration of tellurium dissolved therein and which has high miscibility with other catalyst components can be prepared without corroding the reaction vessel and discharging waste gas that contains air polluting $NO_x$.

Another object of this invention is to provide an industrial process for producing a tellurium-antimony containing oxide catalyst by using the stable tellurium-containing solution.

This invention achieves these objects by using a specific reaction accelerator in dissolving metallic tellurium with hydroxgen peroxide. More specifically, this invention relates to a process for preparing a stable tellurium-containing solution by dissolving metallic tellurium through reaction with hydrogen peroxide in the presence of at least one reaction accelerator selected from among (A) an ammonium ion, (B) an alkali metal ion, and (C) an oxide, oxyacid, or oxyacid salt of at least one element selected from the group consisting of vanadium, molybdenum, and tungsten. The invention also relates to a process for producing a tellurium-antimony containing oxide catalyst wherein a metal oxide composition containing, as essential components, antimony and at least one element selected from the group consisting of iron, cobalt, nickel, manganese, uranium, tin and copper is calcined at a temperature from about 500° C. to 1000° C., the calcined oxide composition is impregnated with an aqueous solution containing tellurium, the resulting oxide composition is dried, and then calcined at a temperature from about 400° C. to 850° C., wherein the impregnating solution consists essentially of the stable tellurium-containing solution described above.

DETAILED DESCRIPTION OF THE INVENTION

As will be shown by Examples hereunder, the reaction accelerator which is present in the reaction system according to this invention accelerates the reaction between metallic tellurium and hydrogen peroxide to provide a stable tellurium-containing solution which has a remarkably increased amount of metallic tellurium dissolved therein. When ammonium ion is used as the reaction is used as the reaction accelerator, its presence does no harm to the preparation of a catalyst, so this invention retains one great advantage inherent in oxidation with hydrogen peroxide (i.e., no contamination by undesired foreign matter). The same advantage is enjoyed by using alkali metal ion if its presence is allowed. The use of a metallic compound such as vanadium as the reaction accelerator is desirable because it is also used as a catalyst component, and, unexpectedly, the metallic compound not only accelerates the oxidation of metallic tellurium which hydrogen peroxide but also eliminates the problem of low miscibility with metallic tellurium that accompanies oxidation with nitric acid.

By using the resulting stable tellurium-containing solution, a tellurium-antimony containing oxide catalyst useful in oxidation of olefins, oxidative dehydrogenation, or ammoxydation can be easily produced on an industrial scale without corroding the reaction vessel or discharging waste gas containing air polluting $NO_x$ as in the case of dissolving metallic tellurium with nitric acid. As is demonstrated by Examples described hereunder, other advantages of the process of this invention for producing a tellurium-antimony containing oxide catalyst are that the process does not greatly depend upon the calcination temperature, that the process provides an antimony-polyvalent metal oxide catalyst having high activity and good physical properties as an accelerator for the formation of unsaturated bonds, and that because the impregnating solution containing additional catalyst components has improved properties, only small amounts of additional catalyst components are necessary to provide a catalyst of high performance.

This invention is hereunder described in more detail.

Preparation of the stable tellurium-containing solution:

The metallic tellurium and hydrogen peroxide used in the preparation of a stable tellurium-containing solution may be an commercially available product. Metallic tellurium is oxidized and dissolved with hydrogen peroxide, and to provide adequate contact with hydrogen peroxide, finely divided metallic tellurium is preferably used. The particles of metallic tellurium may be of any size, but an average size of less than 300 microns is particularly effective. The reaction accelerator specified in this invention, especially ammonium ion, has great ability to accelerate the dissolution of metallic tellurium in hydrogen peroxide, so there is no particular need of finely dividing metallic tellurium. If ammonium ion is used as the reaction accelerator, lumps of metallic tellurium having a diameter of even about several millimeters may be used. Commercial grade hydrogen peroxide having a concentration of from about 30% to 60% may be used either directly or after dilution.

The reaction accelerator is selected from amont the following three substances.

(A) Ammonium ion:

Ammonium ion is the most effective reaction accelerator for the purposes of this invention, and unlike the other reaction accelerators, it does not introduce any undesired metal in the end product. Another advantage of ammonium ion is that orthotelluric acid of high purity which has ammonium ion dispersed as ammonia can be provided if desired. Examples of the source of ammonium ion are ammonia and aqueous ammonia. Ammonium ion may be introduced into the reaction system in the form of a salt and used in the presence of a counter ion. Many examples of the soluble ammonium salt are known, and the desired objects of this invention can be conveniently achieved by using ammonium salts of oxyacid of vanadium, molybdenum and tungsten that may be used as the reaction accelerator in this invention, such as ammonium metavanadate, ammonium molybdate and ammonium tungstate. Other examples of the ammonium salt are ammonium carbonate and bicarbonate.

(B) Alkali metal ion:

An alkali metal hydroxide is the most suitable, and sodium hydroxide and potassium hydroxide are typical examples thereof. Other examples are alkali metal carbonate and bicarbonate.

(C) Oxide, oxyacid or oxyacid salt of at least one element selected from the group consisting of vanadium, molybdenum, and tungsten:

It is desired that these compounds be at least partially soluble in the reaction system for oxidation of metallic tellurium with hydrogen peroxide. Preferred examples of the vanadium compound are vanadium pentoxide, vanadyl oxalate and ammonium metavanadate; preferred examples of the molybdenum compound are molybdenum trioxide, molybdate, ammonium paramolybdate and ammonium metamolybdate; and preferred examples of the tungsten compound are tungsten trioxide, tungstic acid, ammonium metatungstate and ammonium paratungstate. These compounds also seem to have the ability to form a peroxy compound of V, $M_o$ or W with hydrogen peroxide in the reaction system and provide a liquid reaction product having increased stability.

Reaction between metallic tellurium and hydrogen peroxide is performed in an aqueous system. The amount of hydrogen peroxide used is at least about 3 gram mole per gram atom of tellurium. The greater the ratio of hydrogen peroxide to tellurium (gram mol/gram atom), the faster the reaction rate tends to be, but the presence of a great excess of hydrogen peroxide after oxidation is not desirable both for economic and safety reasons. Therefore, the amount of hydrogen peroxide used is suitably from about 3 to 8, preferably from 3.1 to 5 gram mols per gram atom of tellurium. If a metal compound of the group (C) such as vanadium compound is used as the reaction accelerator, hydrogen peroxide is preferably used in an amount about 0.5 to 2 gram mols larger than the amount defined above for oxidation of tellurium.

Even if hydrogen peroxide having a concentration of about 0.05% is used, a practically acceptable reaction rate can be achieved by the effect of the reaction accelerator of this invention. For industrial purposes, hydrogen peroxide having a concentration of 1% or more is adequate. Generally, a commercial hydrogen peroxide solution containing about 30% to 60% hydrogen peroxide (by weight) is used. All hydrogen peroxide may be added to the reaction system at the start of reaction, or it may be added dropwise in small portions while monitoring the progress of reaction.

If ammonium ion or alkali metal ion is used as the reaction accelerator, the reaction system at the start of reaction desirably has a pH of 7 or more, because an even faster reaction rate is achieved under alkaline conditions. A pH of about 7 to 12 is particularly preferred. The pH of the reaction system need not be held at 7 or more once the reaction gets started. If the reaction accelerator is a metallic compound such as vanadium and the like, particularly an oxyacid salt such as ammonium salt or alkali metal salt, the pH of the reaction system may be less than 7, and a pH greater than 1 is generally effective.

The reaction accelerator may be used in any desired amount of the condition that the advantages of this invention are achieved. That is the amounts of the reaction accelerators (A), (B) and (C), which are added, are as follows:

The amount of ammonia water used is determined by various factors. If the reaction mixture has a low pH or if its volume is large, more ammonia water is necessary for a given amount of tellurium. If the reaction mixture has a high pH or if its volume is small, less ammonia water is necessary for a given amount of tellurium. However, using ammonia water is an excessive amount should be avoided because the resulting telluric acid may precipitate in the form of an ammonium salt having a relatively low solubility. For these reasons, it is difficult to categorically define numerically the amount of ammonia water that should be used for a given amount of tellurium, but generally, ammonia water is used in such an amount that ammonium ion is present in an amount of 10 gram ion or less per gram atom of tellurium. Excess ammonia and high tellurium concentration may cause a white precipitate, but this precipitate can be readily dissolved by addition of a mineral acid or organic acid.

In most cases, using excess alkali metal ion is detrimental to the performance of the catalyst produced, so alkali metal ion is preferably used in an amount of 5 gram atom or less per gram atom of tellurium.

A metallic compound of group (C) as discribed above preferably used in an amount of 0.01 to 100 gram atom of vanadium, molybdenum and/or tungsten per gram atom of tellurium. All the reaction accelerator may be added to the reaction system at the start of reaction, or it may be added in divided portions, or different reaction accelerators may be used in combination.

Any reaction temperature may be used, provided that the reaction system is held in liquid phase. But to increase the boiling point of the reaction system under pressure is a difficult operation to do, whereas the use of a temperature close to the boiling point under atomospheric pressure will easily cause wasteful decomposition of hydrogen peroxide. An adequately fast oxidation rate is achieved by the effect of the reaction accelerator of this invention without requiring any heating. Therefore, a temperature in the range of from ordinary temperature to 100° C. is generally the most suitable.

Production of catalyst:

The catalyst produced by the process of this invention has a non-limiting but preferred composition represented by the empirical formula:

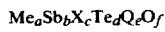

$$Me_aSb_bX_cTe_dQ_eO_f$$

wherein Me is at least one element selected from the group consisting of Fe, Co, Ni, Mn, U, Sn and Cu; X is at least one element selected from the group consisting of V, Mo and W; Q is at least one element selected from the group consisting of Na, K, Mg, Ca, La, Ce, Ti, Zr, Nb, Ta, Cr, Ag, Zn, B, P, Al, Ge and Bi; the subscripts a, b, c, d, e and f represent atomic ratio, and when a is 10, b is 5 to 60 (preferably 5 to 30), c is 0 to 5 (preferably 0.05 to 3), d is 0.01 to 10 (preferably 0.05 to 5), e is 0 to 20 (preferably 0 to 10), and f is the number of oxygen atoms required to combine with the other components identified above and form the corresponding oxide.

The catalyst produced by the process of this invention may be used without a carrier, but preferably, it is supported on a suitable carrier. Examples of the carrier are silica, alumina, titania, zirconia and silica-alumina, and silica is particularly preferred. The amount of the carrier used should be determined by the physical properties of the catalyst required and the reaction rate, and preferably, about 10 to 90% of carrier is used on the basis of the total weight of the catalyst.

In the first step of the process of this invention, an antimony-polyvalent metal containing oxide composition containing, as essential components, antimony and at least one element selected from the group consisting of iron, cobalt, nickel, manganese, uranium, tin and copper is calcined at a temperature between about 500° and about 1000° C. for a period of from about 1 to 50 hours. The calcination may be performed at a single temperature or in two stages, i.e. preliminary calcination and high-temperature calcination. If the calcination at high temperatures, say, 700° C. or higher is desired, the calcination is preferably performed in two stages. In two-stage calcination, preliminary calcination is preferably carried out at a temperature from about 200° C. to 600° C. The optimum calcination conditions vary with the catalyst composition, and preferably, a preliminary calcination at from about 200° C. to 600° C. for about 1 to 50 hours is followed by a high-temperature calcination at from about 600° C. to 1000° C. for about 1 to 50 hours.

The antimony-polyvalent metal containing oxide composition used as the catalyst base may contain additional components such as vanadium, molybdenum, tungsten, tellurium, magnesium, calcium, titanium, zirconium, niobium, tantalum, chromium, silver, zinc, boron, phosphorus, aluminum, germanium and bismuth. Such antimony-polyvalent metal containing oxide composition may be prepared by any of the methods described in U.S. Pat. Nos. 3,668,147, 4,049,575, and other known methods.

The calcined antimony-polyvalent metal containing oxide composition is then impregnated with the stable tellurium-containing solution described above which has metallic tellurium dissolved therein through reaction with hydrogen peroxide in the presence of the reaction accelerator specified herein. Reaction activators of group (C), i.e. vanadium, molybdenum and tungsten compounds, are by far more soluble in hydrogen peroxide than in water. Therefore, an impregnating solution having desired concentrations of tellurium and at least one element selected from the group consisting of vanadium, molybdenum and tungsten can be obtained. An aqueous tellurium-containing solution prepared by oxidizing metallic tellurium with hydrogen peroxide in the presence of ammonium ion of group (A) or alkali metal ion of group (B) has good miscibility with other catalyst components, so the solution may be mixed with a metallic compound of group (C) or a separately prepared aqueous solution of such metallic compound to prepare a desired tellurium-containing impregnating solution. In addition to vanadium, molybdenum or tungsten, the tellurium-containing impregnating solution may optionally contain a suitable amount of water-soluble compounds of elements such as alkaline earth metal, rare earth metal, titanium, zirconium, manganese, iron, cobalt, nickel, ruthenium, rhodium, palladium, osmium, iridium, platinum, copper, silver, zinc, cadmium, boron, aluminum, potassium, indium, thallium, germanium, tin, lead, phosphorus, arsenic, antimony, bismuth, sulfur and selenium. The impregnating solution prepared by the method of this invention remains stable enough for industrial use even after addition of such water-soluble compounds.

The calcined antimony-polyvalent metal containing oxide composition can be impregnated with the tellurium-containing impregnating solution by any method. The most practical method comprises first measuring the volume (ml/g) of the pores in the antimony-polyvalent metal containing oxide composition, preparing a tellurium-containing impregnating solution having a suitable concentration and volume, which are corresponded to the volume of the pores in the antimony-polyvalent metal containing oxide composition measured, and mixing them thoroughly. This method is particularly advantageous when the catalyst base is fluidized. None of the components in the tellurium-containing impregnating solution prepared by the method described above are selectively adsorbed strongly on the antimony-polyvalent metal containing oxide composition calcined by the method of this invention. Therefore, the impregnating components are uniformly impregnated and fixed within the final catalyst, as can be confirmed by analysis of a cross section of the final catalyst with an X-ray microanalyzer.

Adequate impregnation can be achieved by mixing the base catalyst with the impregnating solution thoroughly for a period of about 10 minutes to about 2 hours. The effective amount of the total of the impregnating compontnts in the base catalyst is less than 10 wt% of the base catalyst in terms of oxide, and in most cases, a total of less than 5% is satisfactory. The preferred proportion of the catalyst components in the impregnating solution is Te/(V,Mo,W)/(alkaline earth metal, rare earth metal, Ti, Zr, Mn, Fe, Co, Ni, Ru, Rh, Pa, Os, Ir, Pt, Cu, Ag, Zn, Cd, B, Al, Ga, In, Tl, Ge, Sn, Pb, P, As, Sb, Bi, S, Se) = 1/0-5/0-5.

After impregnation with the tellurium-containing solution, the base catalyst is dried and finally calcined at a temperature from about 400° C. to 850° C. The optimum calcination conditions vary with the type and amount of the catalyst components to be added, but since the activity and physical properties of the catalyst produced by the process of this invention do not greatly depend upon the calcination conditions, process control is easy and calcination at a temperature from about 400° C. to 850° C. for a period of from about 0.5 to about 50 hours serves the intended purpose.

It is not completely clear how the antimony-polyvalent metal containing oxide composition reacts with the catalyst components in the impregnating solution in the process of this invention, but plausibly, tellurium, or both tellurium and vanadium, molybdenum or tungsten easily react with the antimony-polyvalent metal containing oxide composition during final calcination. An X-ray powder diffraction patterns of the catalyst produced have shown that none of the impregnating components are present in the catalyst as free oxides.

The process of this invention can be used to modify existing antimony-polyvalent metal containing oxide catalyst having low performance (as to the production of aimed products) as well as to reactivate an antimony-polyvalent metal containing oxide catalyst which is reduced to be deteriorated during service or which is deactivated due to a decrease (e.g., by release) in the added catalyst components. Therefore, another embodiment of the process of this invention is to reactivate a tellurium-antimony containing oxide catalyst which contains, as essential components, antimony and at least one element selected from the group consisting of iron, cobalt, nickel, manganese, uranium, tin and copper, and as additional components, tellurium or both tellurium and at least one element selected from the group consisting of alkali metal, vanadium, molybdenum and tungsten, when such catalyst is deteriorated reductively or deactivated due to decrease or release of the additional components. Such catalyst is impregnated with an aqueous tellurium-containing solution, the resulting oxide containing composition is dried and then calcined at a temperature between about 400° and about 850° C. The characteristic feature of this embodiment is to use as the tellurium-containing impregnating solution a stable tellurium-containing solution which has metallic tellurium dissolved therein by reaction with hydrogen peroxide in the presence of at least one reaction accelerator selected from among (A) an ammonium ion, (B) an alkali metal ion, and (C) an oxide, oxyacid, or oxyacid salt of at least one element selected from the group consisting of vanadium, molybdenum and tungsten. The preparation of the impregnating solution, and the drying and calcining of the resulting oxide composition in this embodiment can be achieved in entirely the same manner as the already described embodiment of the process for producing a tellurium-antimony containing oxide catalyst, except that the step of calcining the catalyst base is omitted.

The process of this invention is industrially very advantageous because it can produce, consistently and easily, an antimony-polyvalent metal containing oxide catalyst having improved activity and physical properties, and because the process is effective for modifying or reactivating an antimony-polyvalent metal containing oxide catalyst of poor performance. The preferred embodiments and advantages of this invention are now described in greater detail by reference to the following examples and comparative examples, which are given here for illustrative purposes only, and are not intended to limit the scope of the invention. Percent and parts values in the examples are by weight unless otherwise specified.

EXAMPLE 1

A measured amount (12.7 g) of metallic tellurium powder (less than 300μ in size) was suspended in 102 ml of pure water. A 35% hydrogen peroxide solution (12 ml) was added to the suspension, but little metallic tellurium dissolved. When 1 ml of 14% ammonia water was added dropwise, the pH of the suspension was increased to 8.6 (initial $H_2O_2$ conc.=ca. 4%), and a vigorous reaction took place to increase the temperature of the reaction mixture to 95° C. More hydrogen peroxide solution (35%) was added dropwise and when 19 ml of hydrogen peroxide solution was added, all particles of metallic tellurium dissolved in hydrogen peroxide. A total of 31 ml of hydrogen peroxide solution (35%) was used, so the hydrogen peroxide/tellurium ratio was 3.6 (g mol/g atom). The resulting tellurium-containing solution was stable over an extended period of time (at least one week).

EXAMPLE 2

A mixture of 3.83 g of metallic tellurium power (less than 300μ in size) and 2.61 g of ammonium paratungstate was suspended in 40 ml of water. The suspension had a pH of 6.5. After heating the suspension to 90° C., 12 ml of hydrogen peroxide solution was added, whereupon a transparent yellow complete solution of metallic tellurium resulted. This tellurium-tungsten containing solution was stable over an extended period of time (at least one week).

EXAMPLE 3

A measured amount (12.7 g) of metallic tellurium powder (less than 300μ in size) was suspended in 102 ml of pure water. A 35% hydrogen peroxide solution (12 ml) was added to the suspension, but little metallic tellurium dissolved. When 4.3 ml of 10% potassium hydroxide solution was added, the pH was increased to 8.5. When the suspension was heated to 90° C., a reaction took place to provide a complete solution of metallic tellurium in 5 minutes. However, the reaction rate was slower than that achieved in Example 1 by using aqueous ammonia.

COMPARATIVE EXAMPLE 1

A measured amount (12.7 g) of ground particles of a metallic tellurium ingot (520μ in size=50%) was suspended in 20% hydrogen peroxide solution (pH=4.6). At 20° C., the particles of metallic tellurium did not dissolve at all, so the suspension was heated to 90° C. Some particles dissolved, but most particles of metallic tellurium remained insoluble even after 2 hours.

EXAMPLE 4

A catalyst base having an empirical formula of $Fe_{10}Sb_{25}O_{65}(SiO_2)_{30}$ was prepared in the following manner.

The particles of metallic antimony (4.72 kg) were added gradually to 17.5 liters of nitric acid (specific gravity=1.38) that was held at about 80° C. When the antimony was oxidized completely, excess nitric acid was removed and the antimony oxidized with nitric acid was washed with water and transferred to a ball mill where it was ground for 3 hours to provide particles of oxidized antimony (I). Electrolytic iron powder (0.865 kg) was added in small portions to a mixture of 6.25 liters of nitric acid (specific gravity=1.38) and 7.75 liters of water that was held at about 80° C., and this way, a complete solution of iron powder was obtained (II). (I) and (II) were mixed with 13.9 kg of 20% silica sol (III) under thorough stirring while 15% aqueous ammonia was added gradually to adjust the pH of the mixture to 2. The resulting slurry was heated at 100° C. for 3 hours under stirring. After spray drying, the slurry was calcined at 300° C. for 5 hours, at 500° C. for 2 hours and at 850° C. for 2 hours.

Subsequently, 21.8 g of metallic tellurium powder and 12.2 g of ammonium paratungstate were suspended in 140 ml of water, and the suspension was heated at 80° C. When 56 ml of 35% hydrogen peroxide solution was added to the suspension in small portions, a transparent pale yellow solution resulted in about 5 minutes. The solution was diluted with pure water to 614 ml and the dilution was poured over 2 kg of the separately prepared base catalyst (pore volume=0.32 ml/g) while stirring thoroughly. After mixing under stirring for about one hour, the mixture was dried at 120° C. for 16 hours, and calcined first at 400° C. for 4 hours, then at 750° C. for 5 hours. The thus prepared catalyst had an empirical formula of $W_{0.15}Te_{0.55}Fe_{10}Sb_{25}O_{66.55}(SiO_2)_{30}$.

COMPARATIVE EXAMPLE 4-a

An attempt was made to prepare a catalyst of the composition indicated in Example 4 by means of oxidation of tellurium with nitric acid. But since the solubility of tellurium in nitric acid was low, a large amount of nitric acid was necessary. In addition, when the resulting solution was added in a small amount to a separately prepared aqueous solution of ammonium paratungstate, a precipitate was formed immediately. A homogeneous impregnating solution containing both tellurium and tungsten could not be prepared by oxidation of tellurium with nitric acid. So, the attempt to produce a catalyst through oxidation of tellurium with nitric acid was abandoned.

COMPARATIVE EXAMPLE 4-b

It was found in Comparative Example 4-a that a stable solution containing both tellurium and tungsten components was difficult to prepare by oxidation of tellurium with nitric acid. Therefore, a catalyst was made by the following two-stage impregnation.

Two kilograms of the base catalyst having an empirical formula of $Fe_{10}Sb_{25}O_{65}(SiO_2)_{60}$ prepared in Example 4 was weighed. Metallic tellurium powder (21.8 g) was added in small portions to nitric acid (specific gravity=1.284) held at 50° C. until a solution of tellurium was formed. To the solution, 45% nitric acid was added to adjust the volume of the solution to 614 ml.

The resulting solution of tellurium in nitric acid was poured over 2 kg of the base catalyst, and the mixture was stirred thoroughly for about one hour. After drying at 120° C. for 16 hours, the mixture was calcined at 400° C. for 4 hours. Subsequently, 12.2 g of ammonium paratungstate was suspended in 600 ml of pure water under stirring at 70° C. until a complete solution of ammonium paratungstate was obtained. To the solution, pure water was added to adjust its volume to 614 ml, and the resulting dilution was poured over the separately prepared tellurium-impregnated catalyst base, and the mixture was stirred thoroughly for about one hour. After drying at 120° C. for 16 hours, the mixture was calcined first at 400° C. for 4 hours, then at 750° C. for 5 hours. The so prepared catalyst had an empirical formula of $W_{0.15}Te_{0.55}Fe_{10}Sb_{25}O_{66.5}(SiO_2)_{30}$ which was the same as that of the catalyst produced in Example 4.

COMPARATIVE EXAMPLE 5

A catalyst having an empirical formula of $W_{0.25}Te_{1.0}Fe_{10}Sb_{25}O_{67.75}(SiO_2)_{30}$ was prepared in the following manner.

A measured amount (1.95 kg) of metallic antimony powder (less than 100μ in size) was added gradually to 7.2 liters of nitric acid (specific gravity=1.38) held at about 80° C. When complete oxidation of antimony was confirmed, excess nitric acid was removed. The antimony oxidized with nitric acid was washed five times with a total of 2 liters of water, and transferred to a ball mill where it was ground for 3 hours to provide the particles of oxidized antimony (I). Electrolytic iron powder (0.358 kg) was added gradually to a mixture of 3 liters of nitric acid (specific gravity=1.38) and 4 liters of water that was held at about 80° C., and this way, a complete solution of iron powder was obtained. In the solution, 81.8 g of metallic tellurium powder of a purity of 99.9% (less than 200μ in size) was dissolved (II). A measured amount (41.8 g) of ammonium paratungstate was dissolved in 2 liters of water (III). (I), (II) and (III) were mixed with 3.84 kg of silica sol (containing 30 wt% of SiO₂) (IV) under thorough stirring while 15 wt% ammonia water was added gradually to adjust the pH of the mixture to 2. The resulting slurry was heated at 100° C. for 4 hours while stirring, and spray-dried according to the conventional manner. The resulting fine spherical particles were calcined first at 200° C. for 4 hours, at 400° C. for 4 hours, then at 800° C. for 8 hours.

EXAMPLE 5-a

A base catalyst having an empirical formula of $W_{0.25}Te_{1.0}Fe_{10}Sb_{25}O_{67.75}(SiO_2)_{30}$ was prepared in the same manner as in Comparative Example 5. A measured amount (19.2 g) of metallic tellurium powder (less than 300μ in size) was suspended in 80 ml of 0.1% ammonia water, and 35% hydrogen peroxide solution was added to the suspension dropwise while the suspension was held at 90° C. In about 5 minutes, a transparent complete solution of tellurium was obtained. A solution of 3.5 g of ammonium metavanadate in 350 ml of water was added to the solution. The resulting solution was diluted with water to make 500 ml, and the dilution was poured over 2 kg of the base catalyst (pore volume=0.25 ml/g) under thorough stirring for about one hour. Subsequently, the mixture was dried at 120° C. for 16 hours, and calcined first 400° C. for 4 hours, then at 720° C. for 4 hours. The so prepared catalyst had an empirical formula of $V_{0.1}W_{0.25}Te_{1.5}Fe_{10}Sb_{25}O_{69}(SiO_2)_{30}$.

EXAMPLE 5-b

As in Example 5-a, a base catalyst having an empirical formula of $W_{0.25}Te_{1.0}Fe_{10}Sb_{25}O_{67.75}(SiO_2)_{30}$ was prepared. A mixture of 19.2 g of metallic tellurium powder (less than 300μ in size), 3.5 g of ammonium metavanadate and 21.2 g of ammonium paramolybdate was suspended in 200 ml of water, and 35% hydrogen peroxide was added to the suspension dropwise while the suspension was held at 90° C. The resulting solution was diluted with water to make 500 ml, and the dilution was mixed thoroughly with 2 kg of the base catalyst (pore volume=0.25 ml/g) for about one hour. Subsequently, the mixture was dried at 120° C. for 16 hours, and calcined first at 400° C. for 4 hours, then at 720° C. for 4 hours. The thus prepared catalyst had a empirical formula of $V_{0.1}Mo_{0.4}W_{0.25}Te_{1.5}Fe_{10}Sb_{25}O_{70}(SiO_2)_{30}$.

COMPARATIVE EXAMPLE 6

A catalyst having an empirical formula of $W_{0.5}Mo_{1.2}Te_3B_1Co_4Fe_{10}Sb_{25}O_{81.6}(SiO_2)_{60}$ was prepared in the following manner: 5.84 kg of antimony trioxide powder was measured (I). A measured amount (0.894 kg) of electrolytic iron powder was added gradually to a heated mixture of 6.4 liters of nitric acid (specific gravity=1.38) and 4 liters of water. To the resulting solution, 1.864 kg of cobalt nitrate was added (II). To a solution of 210 g of ammonium paratungstate in 18.4 liters of water, 340 g of ammonium paramolybdate, 1.104 kg of telluric acid was added to make a mixed solution (III). Boric acid (98 g) was dissolved in 19.22 kg of silica sol (SiO₂=30 wt%) (IV). To the solution (IV), (III), (II), and (I) were added in the order written, and 15% aqueous ammonia was added gradually to the resulting mixture while stirring thoroughly until the pH of the mixture was 2. The mixture was then heated at 100° C. for 8 hours while stirring thoroughly. The resulting slurry was spray-dried by the conventional method. The thus obtained fine spherical particles were calcined first at 250° C. for 8 hours, then at 400° C. for 16 hours, and divided into two groups, one of which was calcined at 700° C. for 4 hours and the other of which was calcined at 720° C. for 4 hours.

EXAMPLE 6-a

A base catalyst having an empirical formula of $Mo_{0.5}B_1Co_4Fe_{10}Sb_{25}O_{72}(SiO_2)_{60}$ was prepared in the same manner as in Comparative Example 6, except that W or Te component was not used and that the fine spherical particles were calcined at 860° C. for 4 hours.

Subsequently, a mixture of 44.1 g of metallic tellurium powder (less than 200μ in size), 8.1 g of ammonium paramolybdate and 12.0 g of ammonium paratungstate was suspended in 250 ml of water, and to the suspension, 35% hydrogen peroxide solution was added gradually while the suspension was held at 90° C. In about 5 minutes, a transparent yellow complete solution of tellurium, molybdenum and tungsten was obtained. The solution was diluted with water to make 580 ml, and the dilution was mixed thoroughly with 2 kg of the base catalyst (pore volume=0.29 ml/g) for about one hour. Then, the mixture was dried at 120° C. for 16 hours, and calcined first at 400° C. for 4 hours, then at 750° C. for 4 hours. The thus prepared catalyst had a empirical formula of $W_{0.2}Mo_{0.7}Te_{1.5}B_1Co_4Fe_{10}Sb_{25}O_{76.2}(SiO_2)_{60}$.

EXAMPLE 6-b

A base catalyst having an empirical formula of $Mo_{0.5}B_1Co_4Fe_{10}Sb_{25}O_{72}(SiO_2)_{60}$ was prepared in the same manner as in Example 6-a. A mixture of 115 g of metallic tellurium powder (less than 300μ in size) and 36 g of ammonium paratungstate was suspended in 600 ml of water, and to the suspension, 60% hydrogen peroxide solution was added in small portions while the suspension was held at 90° C. In about 10 minutes, tellurium dissolved completely and a transparent pale yellow solution was formed. In the solution, 60.3 g of nickel nitrate was dissolved, and the mixed solution was diluted with water to make 1.74 liters. The dilution was mixed thoroughly with 6 kg of the previously prepared base catalyst (pore volume=0.29 ml/g) for about 30 minutes. Then, the mixture was dried at 120° C. for 16 hours, calcined at 400° C. for 4 hours, and divided into three groups which were calcined for 4 hours at 700° C., 720° C. and 740° C. respectively. Catalysts having an empirical formula of $W_{0.2}Mo_{0.5}Te_{1.3}B_1Ni_{0.3}Co_4Fe_{10}Sb_{25}O_{75.5}(SiO_2)_{60}$ were produced.

COMPARATIVE EXAMPLE 6-a

A catalyst having an empirical formula of $W_{0.2}Mo_{0.7}Te_{1.5}B_1Co_4Fe_{10}Sb_{25}O_{76.2}(SiO_2)_{60}$ was prepared in the same manner as in Comparative Example 6. The thus obtained fine spherical particles were calcined first at 250° C. for 8 hour, then at 400° C. for 16 hours, and divided into two groups, one of which was calcined at 700° C. for 4 hours and the other of which was calcined at 770° C. for 4 hours. From the results of this experiments, it can be seen that the catalyst prepared at the calcination temperature of 700° C. for 4 hours experienced a greater time-dependent change in the yield of acrylonitrile because of the large amount of carbonic acid gas ($CO_2$) evolved. Therefore, the exact activity test result of such catalyst was not obtained. The results of the activity test of the catalyst calcined at 770° C. for 4 hours are set forth in Table 1 below.

EXAMPLE 7

A catalyst having an empirical formula of $Mo_{0.25}Te_{1.0}Cu_{0.5}Fe_{10}Sb_{25}O_{68.25}(SiO_2)_{60}$ was prepared in the following manner: 5.82 kg of antimony trioxide powder was measured (I). A measured amount (0.894 kg) of electrolytic iron powder was added gradually to a heated mixture of 7.1 liters of nitric acid (specific gravity=1.38) and 9.0 liters of water. In the resulting solution, 204 g of metallic tellurium powder was dissolved by addition of small portions (II). A measured amount (70.6 g) of ammonium paramolybdate was dissolved in one liter of water (III). 28.84 kg of 20% Silica sol was measured (IV). Copper nitrate (194 g) was dissolved in one liter of water (V). To the silica sol (IV), (II), (V), (I) and (III) were added, in the order listed, and while stirring throughly, 15% aqueous ammonia was added dropwise to adjust the pH of the mixture to 2. The mixture was then heated at 100° C. for 4 hours under stirring. The resulting slurry was spray-dried by a conventional method, and calcined first at 250° C. for 2 hours, then at 400° C. for 2 hours, and finally at 810° C. for 4 hours. A fluidized bed reactor having a fluidized section (I.D.=8 inches) was packed with the resulting catalyst and used in ammoxydation of propylene under the following test conditions.

Test conditions

Gas linear velocity: 18 cm/sec
Reaction pressure: 0.5 kg/cm²G
Gas/propylene molar ratio:
  $O_2$ (supplied as air)/propylene=2.2:1
  $NH_3$/propylene=1.1:1

When ammoxidation was performed under these conditions at 440° C. for 500 hours, the yield of acrylonitrile, which was 71% at the start of reaction, was reduced to 69%. The deteriorated catalyst was drawn from the reactor and 2 kg of it was reactivated by the process of this invention as follows. First, 15.0 g of metallic tellurium powder was suspended in 140 ml of pure water, and to the suspension, 1 ml of 15% aqueous ammonia was added to adjust the pH of the suspension to 9. When 36 ml of 35% hydrogen peroxide solution was added to the suspension in small portions, tellurium dissolved completely, generating heat and foam. To the solution, pure water was added to make 538 ml. The resulting dilution was poured over 2 kg of the deteriorated catalyst (pore volume=0.28 ml/g) and mixed well for about one hour. The mixture was dried at 120° C. for 16 hours, and calcined first at 400° C. for 4 hours, then at 730° C. for 5 hours. The thus prepared catalyst had an empirical formula of $Mo_{0.25}Te_{1.50}Cu_{0.5}Fe_{10}Sb_{25}O_{69.25}(SiO_2)_{60}$. The catalyst was identified as the catalyst of Example 7. The catalyst having an empirical formula of $Mo_{0.25}Te_{1.0}Cu_{0.5}Fe_{10}Sb_{25}O_{68.25}(SiO_2)_{60}$ was used in ammoxidation of propylene in a fluidized bed reactor (I.D.=2 in., height=2 mm) at a reaction temperature of 460° C. and for a contact time of 3.5 seconds under the activity test conditions specified below. The result was: the yield of acrylonitrile was 78.1% and the conversion of propylene was 98.1%. In contrast, the deteriorated catalyst achieved 75.3% (yield of acrylonitrile) and 96.3% (conversion of propylene).

COMPARATIVE EXAMPLE 7

Two kilograms of the deteriorated catalyst was drawn from the reactor used in the experiment conducted in Example 7. A measured amount (15.0 g) of metallic tellurium powder was added to 45% heated nitric acid (50° C.) in small amounts until it dissolved completely. To the solution, 45% nitric acid was added to make 538 ml. The dilution was poured over 2 kg of the deteriorated catalyst and mixed well for about one hour. The mixture was dried at 120° C. for 16 hours, and calcined first at 400° C. for 4 hours, then at 730° C. for 5 hours. The thus prepared catalyst had an empirical formula of $Mo_{0.25}Te_{1.5}Cu_{0.5}Fe_{10}Sb_{25}O_{69.25}(SiO_2)_{60}$, which was the same as that of the catalyst of Example 7.

The catalysts of Examples 1 to 7 and comparative Examples 1 to 7 were subjected to activity tests under the following conditions, and the results are set forth in Table 1 below.

Activity testing procedure

Ammoxidation of propylene: A fluidized bed reactor having a fluidized section (I.D.=2 inches, height=2 m) was packed with 1200 to 1800 g of catalysts. The reactor was fed with gases of the following composition at an apparent linear velocity of 15 cm/sec. The reaction was performed at atmospheric pressure.

Oxygen (supplied as air)/propylene=2.10:1.0 (molar ratio)
Ammonia/propylene=1.15:1.0 (molar ratio)

The terms "yield" and "selectivity" of the end product, and "contact time" as used herein and in Table 1 have the following definitions:

Yield (%) = $\frac{\text{carbon weight of the end product obtained}}{\text{carbon weight of the hydrocarbon supplied}} \times 100$ Selectivity (%) =

$\frac{\text{carbon weight of the end product obtained}}{\text{carbon weight of the hydrocarbon reacted}} \times 100$ Contact time = $\frac{\text{Volume packed with catalyst (l)}}{\text{flow rate of gas supplied (l/sec)}}$ [sec]

effect of increasing the performance of the catalyst) of modifying a catalyst in the process of the present invention as compared with the conventional processes. In Examples 5-a and 5-b, better catalysts were produced by treating a catalyst as in Comparative Example 5 according to the process of this invention.

In Example 6, better catalysts were produced using smaller amounts of relatively costly W, Mo and Te than required in the production of the catalyst of Comparative Example 6. The data in Table 1 with respect to Example 6-b shows that the process of this invention depends less on the calcination temperature and hence is easy to use on an industrial scale. This demonstrates that

TABLE 1

| | | Calcination conditions | | Testing conditions | | Test results | | |
|---|---|---|---|---|---|---|---|---|
| | | Temp. (°C.) | Time (hr.) | Reaction temp. (°C.) | Contact time (sec.) | Yield of acrylonitrile (%) | Conversion of propylene (%) | Selectivity for acrylonitrile (%) |
| Example 4 | $W_{0.15}Te_{0.55}Fe_{10}Sb_{25}O_{66.55}(SiO_2)_{30}$ | 750 | 5 | 470 | 3.5 | 81.2 | 98.0 | 82.9 |
| Comp. Ex. 4-b | " | 750 | 5 | 470 | 3.5 | 78.6 | 99.1 | 79.3 |
| Comp. Ex. 5 | $W_{0.25}Te_{1.0}Fe_{10}Sb_{25}O_{67.75}(SiO_2)_{30}$ | 800 | 8 | 470 | 4.5 | 79.8 | 97.5 | 81.8 |
| Example 5-a | $V_{0.1}W_{0.25}Te_{1.5}Fe_{10}Sb_{25}O_{69}(SiO_2)_{30}$ | 720 | 4 | 460 | 4.0 | 82.1 | 97.4 | 84.3 |
| Example 5-b | $V_{0.1}Mo_{0.4}W_{0.25}Te_{1.5}Fe_{10}Sb_{25}O_{70}(SiO_2)_{30}$ | 720 | 4 | 460 | 3.5 | 83.0 | 97.8 | 84.9 |
| Comp. Ex. 6 | $W_{0.5}Mo_{1.2}Te_3Bi_1Co_4Fe_{10}Sb_{25}O_{81.6}(SiO_2)_{60}$ | 700 | 4 | 450 | 3.5 | 83.2 | 98.1 | 84.8 |
| | | 720 | 4 | 450 | 4.0 | 79.3 | 98.3 | 80.1 |
| Example 6-a | $W_{0.2}Mo_{0.7}Te_{1.5}Bi_1Co_4Fe_{10}Sb_{25}O_{76.2}(SiO_2)_{60}$ | 750 | 4 | 450 | 3.0 | 83.8 | 97.7 | 85.8 |
| | | 700 | 4 | 450 | 3.5 | 83.8 | 97.9 | 85.6 |
| Example 6-b | $W_{0.2}Mo_{0.5}Te_{1.3}Bi_1Ni_{0.3}Fe_{10}Sb_{25}O_{75.5}(SiO_2)_{60}$ | 720 | 4 | 450 | 3.5 | 84.0 | 97.6 | 86.1 |
| | | 740 | 4 | 450 | 3.5 | 84.1 | 97.6 | 86.2 |
| Comp. Ex. 6-a | $W_{0.2}Mo_{0.7}Te_{1.5}Bi_1Co_4Fe_{10}Sb_{25}O_{76.2}(SiO_2)_{60}$ | 700 | 4 | 450 | 3.0 | * | * | — |
| | | 770 | 4 | 450 | 3.0 | 79.6 | 94.5 | 84.2 |
| Example 7 | $Mo_{0.25}Te_{1.5}Cu_{0.5}Fe_{10}Sb_{25}O_{69.25}(SiO_2)_{60}$ | | | | 2 hours after start of reaction | | | |
| | | 730 | 5 | 460 | 3.5 | 78.5 | 99.2 | 79.1 |
| | | | | | 358 hours after start of reaction | | | |
| | | 730 | 5 | 460 | 3.5 | 78.1 | 98.7 | 79.1 |
| Comp. Ex. 7 | " | | | | 2 hours after start of reaction | | | |
| | | 730 | 5 | 460 | 3.5 | 77.9 | 98.9 | 78.8 |
| | | | | | 320 hours after start of reaction | | | |
| | | 730 | 5 | 460 | 3.5 | 76.6 | 97.8 | 78.3 |
| The prepared catalyst before deterioration in Ex. 7 | $Mo_{0.25}Te_{1.0}Cu_{0.5}Fe_{10}Sb_{25}O_{68.25}(SiO_2)_{60}$ | 810 | 4 | 460 | 3.5 | 78.1 | 98.1 | 79.6 |
| The deteriorated catalyst to be used in Ex. 7 and Comp. Ex. 7 | " | 810 | 4 | 460 | 3.5 | 75.3 | 96.3 | 78.2 |

*The prepared catalyst experienced a greater time-dependent change in the yield of acrylonitrile because of the large amount of carbonic acid gas. Therefore, the exact test result was not obtained.

In example 4, there was no problem with the preparation of a tellurium-containing impregnating solution, and the catalyst produced in that example performed well in the activity test. However, a stable impregnating solution containing both Te and W components could not be produced by oxidizing metallic tellurium powder with nitric acid (Comparative Example 4-a). A catalyst was prepared by a two-stage impregnation (Comparative Example 4-b), which provided a useful catalyst, but this comparative method required repeating the cycle comprising impregnation, drying and calcination, and hence it was complex and costly compared to the preparative process of this invention. Furthermore, the resulting catalyst had no higher activity than the catalyst of this invention (Example 4).

Examples 5-a and 5-b, and Comparative Example 5 were performed to demonstrate the excellent effect (i.e., the process of this invention retains the advantages of the method described in U.S. Pat. No. 4,049,575 even in smaller amounts of W, Mo and Te than required in the production of the conventional catalyst. The data in Table 1 with respect to Comparative Example 6-a shows that the catalyst (equal to the catalyst composition of Ex. 6-a) prepared in accordance with the process of Comparative Example 6 is not useful to obtain acrylonitrile in the suitable yield when the calcination temperature is not increased to 770° C. As a result, such catalyst (Comp. Ex. 6-a) comprising small amounts of W, Mo and Te in the conventional production results in the reduction of the reaction rate.

In Example 7, a deteriorated catalyst could be reactivated effectively by the process of this invention. In Comparative Example 7, a solution prepared by oxidizing metallic tellurium powder with nitric acid was used as an impregnant. That method was able to regenerate a deteriorated catalyst, but because much nitric acid and nitrogen oxides were evolved during the drying and calcination of the catalyst impregnated with the impregnating solution, the method was highly disadvantageous in industrial practice, and furthermore, the performance of the reactivated catalyst was slightly lower than that of the catalyst of Example 7. In addition, the catalyst reactivated in Comparative Example 7 experienced a greater time-dependent change in activity than the catalyst of Example 7.

While the invention has been described in detail and with reference to specific embodiments thereof, it will be apparent to one skilled in the art that various changes and modifications can be made therein without departing from the spirit and scope thereof.

What is claimed is:

1. A process for preparing a stable tellurium-containing solution from metallic tellurium by dissolving metallic tellurium by reaction with hydrogen peroxide in the presence of at least one reaction accelerator selected from the group consisting of (A) an ammonium ion, (B) an alkali metal ion, and (C) an oxide, oxyacid, or oxyacid salt of at least one element selected from the group consisting of vanadium, molybdenum, and tungsten.

2. A process according to claim 1 wherein the reaction accelerator is (A) or (B) and the reaction system has a pH of at least 7.

3. A process according to claim 1 wherein the reaction accelerator is (C) and the reaction system has a pH of at least 1.

4. A process according to claim 1, 2 or 3 wherein the ratio of hydrogen peroxide to tellurium (gram mol/gram atom) is at least 3/1.

5. A process according to claims 1, 2 or 3 wherein the metallic tellurium is in the form of particles having an average size of 300 microns or less.

6. A process according to claim 4 wherein the ratio of hydrogen peroxide to tellurium is from about 3/1 to 3/1.

7. A process according to claim 4 wherein the ratio of hydrogen peroxide to tellurium is from 3.1/1 to 5/1.

8. A process for producing a tellurium-antimony containing oxide catalyst wherein a metal oxide composition consisting essentially of antimony and at least one element selected from the group consisting of iron, cobalt, nickel, manganese, uranium, tin and copper is calcined at a temperature from about 500° C. to 1000° C., the calcined oxide composition is impregnated with an aqueous solution containing tellurium, the resulting oxide composition is dried, and then calcined at a temperature from about 400° C. to 850° C., wherein the impregnating solution containing tellurium consists essentially of a stable tellurium-containing solution prepared by dissolving metallic tellurium through reaction with hydrogen peroxide in the presence of at least one reaction accelerator selected from the group consisting of (A) an ammonium ion, (B) an alkali metal ion, and (C) an oxide, oxyacid, or oxyacid salt of at least one element selected from the group consisting of vanadium, molybdenum, and tungsten.

9. A process according to claim 8 wherein the reaction accelerator is (A) or (B) and the reaction system has a pH of at least 7.

10. A process according to claim 8 wherein the reaction accelerator is (C) and the reaction system has a pH of at least 1.

11. A process according to claim 8, 9, or 10 wherein the ratio of hydrogen peroxide to tellurium (gram mol/gram atom) is at least 3/1.

12. A process according to claim 8, 9, or 10 wherein the metallic tellurium is in the form of particles having an average size of 300 microns or less.

13. A process according to claim 8, 9, or 10 wherein the tellurium-containing impregnating solution is made of the stable tellurium containing solution which further contains a compound of at least one element selected from the group consisting of magnesium, calcium, lanthanum, cerium, titanium, zirconium, manganese, iron, cobalt, nickel, copper, silver, zinc, boron, aluminum, germanium, tin, phosphorus, antimony, and bismuth.

14. A process according to claim 8, 9, or 10 wherein the catalyst produced has a composition represented by the empirical formula:

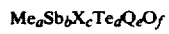

$$Me_aSb_bX_cTe_dQ_eO_f$$

wherein Me is at least one element selected from the group consisting of Fe, Co, Ni, Mn, U, Sn and Cu; X is at least one element selected from the group consisting of V, Mo and W; Q is at least one element selected from the group consisting of Na, K, Mg, Ca, La, Ce, Ti, Zr, Nb, Ta, Cr, Ag, Zn, B, P, Al, Ge and Bi; the subscripts a, b, c, d, e and f represent the atomic ratio, and when a is 10, b is from 5 to 60, c is from 0 to 5, d is from 0.01 to 10, e is from 0 to 20, and f is the number of oxygen atoms required to combine with the other components to form the corresponding oxides.

15. A process according to claim 14 wherein when a is 10, b is from 5 to 30, c is from 0.05 to 3, d is from 0.05 to 5, e is from 0 to 10, and f is the number of oxygen atoms required to combine with the other components to form the corresponding oxide.

16. A process for reactivating a tellurium-antimony containing oxide catalyst consisting essentially of antimony and at least one element selected from the group consisting of iron, cobalt, nickel, manganese, uranium, tin and copper, and as an additional component tellurium or tellurium and at least one element selected from the group consisting of alkali metal, vanadium, molybdenum, and tungsten, and which has been deteriorated reductively or deactivated due to a decrease in the content of the additional components, by impregnating said catalyst with an aqueous tellurium-containing solution, drying the resulting oxide containing composition, and calcining the same at a temperature between about 400° and about 850° C., wherein said tellurium-containing impregnating solution consisting essentially of a stable tellurium-containing solution prepared by dissolving metallic tellurium through reaction with hydrogen peroxide in the presence of at least one reaction accelerator selected from the group consisting of (A) an ammonium ion, (B) an alkali metal ion, and (C) an oxide, oxyacid, or oxyacid salt of at least one element selected from the group consisting of vanadium, molybdenum, and tungsten.

17. A process according to claim 16 wherein the reaction accelerator is (A) or (B) and the reaction system has a pH of at least 7.

18. A process according to claim 16 wherein the reaction accelerator is (C) and the reaction system has a pH of at least 1.

19. A process according to claim 16, 17 or 18 wherein the ratio of hydrogen peroxide to tellurium (gram mol/gram atom) is at least 3/1.

20. A process according to claim 16, 17, or 18 wherein the metallic tellurium is in the form of particles having an average size of 300 microns or less.

21. A process according to claim 16, 17, or 18 wherein the tellurium-containing impregnating solution is made of the stable tellurium containing solution which further contains a compound of at least one element selected from the group consisting of magnesium, calcium, lanthanum, cerium, titanium, zirconium, manganese, iron, cobalt, nickel, copper, silver, zinc, boron, aluminum, germanium, tin, phosphorus, antimony, and bismuth.

22. A process according to claim 16, 17, or 18 wherein the catalyst produced has a composition represented by the empirical formula:

$$Me_aSb_bX_cTe_dQ_eO_f$$

wherein Me is at least one element selected from the group consisting of Fe, Co, Ni, Mn, U, Sn and Cu; X is at least one element selected from the group consisting of V, Mo and W; Q is at least one element selected from the group consisting of Na, K, Mg, Ca, La, Ce, Ti, Zr, Nb, Ta, Cr, Ag, Zn, B, P, Al, Ge and Bi; the subscripts a, b, c, d, e and f represent the atomic ratio, and when a is 10, b is from 5 to 60, c is from 0 to 5, d is from 0.01 to 10, e is from 0 to 20, and f is the number of oxygen atoms required to combine with the other components to form the corresponding oxides.

23. A stable tellurium-containing solution prepared by a process comprising dissolving metallic tellurium by reaction with hydrogen peroxide in the presence of at least one reaction accelerator selected from the group consisting of (A) ammonium ion, (B) alkali metal ion, and (C) an oxide, oxyacid, or oxyacid salt of at least one element selected from the group consisting of vanadium, molybdenum, and tungsten.

24. A solution according to claim 23 wherein the reaction accelerator is (A) or (B) and the reaction system has a pH of at least 7.

25. A solution according to claim 23 wherein the reaction accelerator is (C) and the reaction system has a pH of at least 1.

26. A solution according to claim 23, 24, or 25, wherein the ratio of hydrogen peroxide to tellurium (gram mol/gram atom) is at least 3/1.

27. A solution according to claim 23, 24, or 25, wherein the metallic tellurium is in the form of particles having an average size of 300 microns or less.

* * * * *